H. S. ASHENHURST.
PROCESS OF TREATING ASBESTOS BEARING ROCK.
APPLICATION FILED NOV. 18, 1918.
1,317,852.
Patented Oct. 7, 1919.
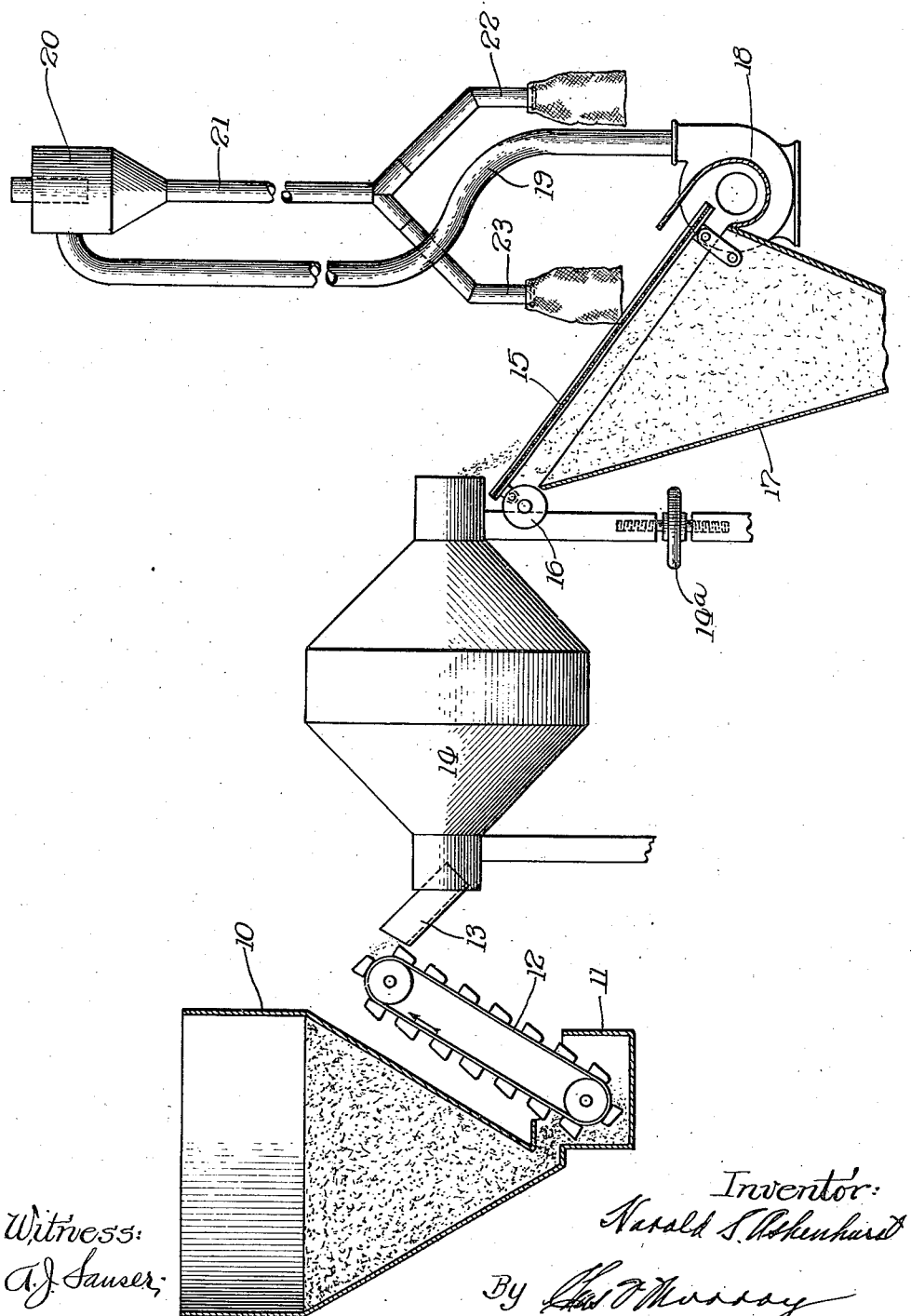

UNITED STATES PATENT OFFICE.

HAROLD S. ASHENHURST, OF CHICAGO, ILLINOIS, ASSIGNOR OF ONE-HALF TO JOSEPH D. HUBBARD, OF CHICAGO, ILLINOIS.

PROCESS OF TREATING ASBESTOS-BEARING ROCK.

1,317,852. Specification of Letters Patent. Patented Oct. 7, 1919.

Application filed November 18, 1918. Serial No. 262,953.

*To all whom it may concern:*

Be it known that I, HAROLD S. ASHENHURST, a citizen of the United States, and resident of Chicago, in the county of Cook and State of Illinois, have invented certain new and useful Improvements in Processes of Treating Asbestos-Bearing Rock, of which the following is a specification.

My invention relates to a novel method of recovering a commercial asbestos product from the waste of asbestos mills.

In the production of asbestos fibers, the rock is crushed and the fibers mechanically separated therefrom. There remains a residue called asbestos sand of which there are enormous quantities. This sand which is known to contain a relatively large quantity of asbestos has heretofore been considered valueless, because of the difficulty in separating any asbestos therefrom which would be useful as a commercial article. By my method, however, I am able to produce a substance which has a great value in many of the arts particularly as an asbestos cement.

Contrary to the well established belief, I have been able to demonstrate that asbestos when properly prepared, possesses distinct cementitious properties which may be utilized for the production of an asbestos cement. A cement of this character to be of the hightest value, should be very light and should have a negligible coefficient of expansion; it should be plastic and an efficient non-conductor of heat. These advantages are present in the material produced in accordance with my method. As no binder or substance of any kind other than water is added thereto in forming the cement, the molded product is very light. On the addition of water the substance crystallizes slowly, a small proportion of the water being absorbed in the process, the remainder evaporating. The final structure is crystalline but not extremely hard or tough and forms the most highly desirable asbestos cement now known.

Because of the mild reaction which takes place on the addition of water to the substance no substantial amount of heat is produced and the stresses to be taken care of in the mass as it approaches its final condition are inconsequential. Therefore, no cracks or seams will occur in the mass. Any slight stresses are equalized in the material because of its relatively soft, felty character.

The results secured are possible because of the production of the substance in a certain definite condition, the method of production being claimed herein. I have found that although the substance in question is mildly alkaline, it is insufficiently so to secure any appreciable reaction with water which would result in cohesion unless so extremely finely divided as to expose a relatively enormously great area to the action of the water. However, this in itself would not solve the problem, as the waste product in question has heretofore been ground to all degrees of fineness without the discovery of any substance which was useful either as a cement or otherwise. I have found that by grinding the sand to a certain degree of fineness and individualizing the particles of a certain size the product herein described is secured. The steps of grinding and separating as by screening are not sufficient to produce the best commerical product, this for the reason that it is too heavy, the particles are packed and matted together and it does not form a readily workable cement. The operation of aerating the substance after it passes over the screen seems to perfect the product and give it all the advantages heretofore set forth. In the final product the majority of the individual particles going to make up the mass are in the form of monoclinic crystals, individual, hairlike fibers ordinarily projecting therefrom. During the aerating step each of the particles is separated and upon being again intimately associated, the fiber projections from the particles serve to space the particles from each other to the desired degree resulting in a relatively light product. However, by reason of the finely divided condition of the substance and the form of the crystals, there is a relatively great area of exposure to the action of the water and the soluble silicates pass into solution. This solution permeates the spaces between the fibers. It is weakly alkaline and even as weak an acid as carbon dioxid which is present in the air and in the water, serves to displace the silica from its salts and free silicic acid is precipitated. This acid permeates the mass and on complete drying silicon dioxid is formed which is the final binding substance. The quantity of this substance is relatively small and is insufficient to bind together an aggregate in which any substantial quantities of rock or other inert substances are found. In other words, all the particles in the mass must contribute their quota of the soluble silicates. A complete description of the product from a technical standpoint is to be found in a copending application Serial No. 262,954, filed of even date herewith.

It will be apparent that the degree of separation and the fineness of the product are correlated. If the product is too coarsely ground the particles will be of such size as to preclude the release of sufficient of the soluble silicate to effect the binding action. If ground too finely and screened improperly the individual particles will release so small a quantity of the silicates as to have no effective binding action on the relatively widely separated, flocculent fibers. Therefore, the substance must be so treated as to possess certain well-defined characteristics as to size of particles and weight per cubic foot.

The method and apparatus will be better understood by reference to the accompanying drawing, in which the figure is a diagrammatic view showing apparatus of the character described.

In carrying out the invention the asbestos sand is placed in a large hopper or bin 10, having a lower outlet communicating with a container 11. A bucket elevator 12, serves to raise the sand to a suitable height, discharging the same through a chute 13 into a ball mill 14, or similar grinding device. In this mill the substance is ground for a length of time varying somewhat, according to the different qualities of the raw material. Usually, the grinding is accomplished in about thirty minutes. The degree of fineness to which the material is ground may be controlled by raising or lowering the discharge end of the mill. Means such as the screw 14$^a$ may be utilized for the purpose. The ground substance is discharged through the open end of the mill onto a screen 15, suitable means such as the eccentric 16, being employed for reciprocating or vibrating the screen as desired. The screen will be of very fine mesh, preferably nine hundred mesh per square inch. Such of the substance as passes through the screen is received in a hopper 17, and subsequently conveyed away. The material which is carried over the screen, which should be substantially 66⅔ per cent., by weight of the original substance, is taken up by a blower 18, and delivered through a pipe 19, to an elevated point where it is discharged into a dust separator 20, of any suitable form. In this separator any fine dust which may have been carried over on the screen is separated and discharged upwardly, the residue being permitted to freely fall by gravity through a relatively long pipe 21. The lower end of the pipe is bifurcated to provide two outlets 22, 23, over the ends of which bags or similar containers may be placed, the product being delivered alternately through the different outlets.

The final product should weigh approximately twenty-five pounds per cubic foot. Such a product is secured by careful attention to the grinding, the degree of fineness to which the material is ground being correlated with the size of the screen. If the substance is insufficiently ground the product will be too heavy; and if it is ground too much it will likewise be too heavy, assuming that the same size screen is used. If a finer mesh screen is employed the product will likewise be too heavy; and if a coarser mesh is employed, it will be too light. Products having a weight anywhere from ten to forty pounds per cubic foot may be secured in the manner described. As stated, however, the product best adapted for commercial use will weigh approximately twenty-five pounds per cubic foot.

I have found, also, that the material coming from the screen and before being taken up by the fan, even if properly ground, is unsuitable for commercial use. Microscopic examinations show that the particles going to make up the mass are matted and packed and considerable foreign matter is trapped or held thereby. The blower acts, first, to assist in breaking up the matted materials, but the final step which serves to produce the desired quality of the product, is that of permitting the same to freely fall by gravity through a suitable distance. There being no disturbing air pressures, the particles become separated and are permitted to assume their natural form. Thus in subsequent operations, the particles have no inherent stresses and are inert, and there is no tendency toward expansion or contraction.

While I have herein referred to a product having a weight of 25 pounds per cubic foot, it will be understood that this weight is that of the material at the time it is received from the producing apparatus and that due to its peculiar characteristics it has a tendency to pack when vibrated or jarred as in shipping. Therefore, a product which had the specified weight at the mill might weigh considerable more at the time it reached the user. It will also be understood that considerable variation in the weight is possible with equally desirable results.

It will be readily understood that the form of the apparatus is unimportant, as similar results might be secured by the use of an entirely different mechanism. Any suitable grinding device might be employed as well as any desirable blower or dust separator. In fact, I am not certain but that the blower might be eliminated if the product was allowed to fall by gravity, a suitable distance. Thus it will be seen that the invention is capable of considerable modification, both in the apparatus and in the process.

I claim:

1. The method of extracting asbestos in a finely divided condition from waste asbestos sand, which consists in pulverizing the sand, then mechanically separating the fibrous portions from the residue, then aerating the fibrous portions to segregate the particles thereof, thereby producing a substance weighing approximately twenty-five pounds per cubic foot, substantially as described.

2. The method of extracting asbestos in a finely divided condition from waste asbestos sand, which consists in pulverizing the sand, then mechanically separating the asbestos from the residue, then relieving the particles from restraint and pressure thereby permitting each particle to assume a shape determined by its stresses whereby upon again being combined the particles are inert, substantially as described.

3. The method of extracting a commercially useful asbestos product from the waste of asbestos mills which consists in grinding the waste, then screening out the fibrous particles, then separating the particles from each other, whereby each particle is free to assume its characteristic form, and then combining the particles for commercial use, substantially as described.

4. The method of treating asbestos-bearing sand which consists in grinding the same until substantially 66⅔ per cent. by weight thereof will be retained on a nine hundred mesh screen, then aerating the retained product to separate the individual particles thereof, substantially as described.

5. The method of treating asbestos-bearing sand which consists in grinding the same until substantially 66⅔ per cent. by weight thereof will be retained on a nine hundred mesh screen, then aerating the retained product by allowing it to freely fall by gravity in an inclosed space in order to separate the individual particles thereof, substantially as described.

6. The method of treating asbestos-bearing sand which consists in grinding the same until substantially 66⅔ per cent. by weight thereof will be retained on a nine hundred mesh screen, then passing the product through a dust separator and then allowing it to freely fall in an inclosed space, substantially as described.

Signed at Chicago, Illinois, this 14th day of November, 1918.

HAROLD S. ASHENHURST.

Witness:
T. D. BUTLER.